June 10, 1952   M. GELFAND ET AL   2,600,107
ELECTROLYTIC BONE DECALCIFICATION PROCESS
Filed June 21, 1948

Inventors,
MAX GELFAND
IRVING M. RICHMAN
By Mason, Fenwick & Lawrence
ATTORNEYS

Patented June 10, 1952

2,600,107

UNITED STATES PATENT OFFICE 2,600,107

ELECTROLYTIC BONE DECALCIFICATION PROCESS

Max Gelfand, Dallas, Tex., and Irving M. Richman, New Orleans, La.

Application June 21, 1948, Serial No. 34,274

11 Claims. (Cl. 204—131)

This invention relates to an improved process for decalcifying ossified tissues such as bone. More specifically, it relates to a process for removing the insoluble calcium salts which render ossified tissues opaque.

It is essential for histological examinations of ossified tissues, such as bone, that the obscuring mineral depositions be removed in order to obtain transparent sections. The mineral composition of bone comprises insoluble complex salts, which in general may be represented by the empirical formula:

$$[Ca_3 (PO_4)_2 CaX]_n$$

where $n$ may be 2 or 3 and X may be carbonate, oxide, fluoride, chloride or sulfate radicals.

The removals of these insoluble calcium salts has hitherto posed a difficult problem to the technician, inasmuch as adequate removal by present known methods is exceedingly time-consuming and the sections finally obtained lack uniformity. The method suggested by R. A. J. Wilson in the American Journal of Clinical Pathology (Technical Section), volume 12, pages 79 to 82, 1942, wherein the bone is subjected to various acid solutions under reduced pressure requires at least twenty-four hours, and other methods require from several days to several weeks. Another serious disadvantage encountered in many methods in general use, is the frequent concomitant destruction of tissue.

The object of this invention is to provide a simple and reliable process for removing insoluble calcium salts from ossified tissues rapidly and without destruction of tissue.

Another object is to provide suitable apparatus for carrying out this process.

Other objects and advantages will become evident from the following description and the appended drawings.

Essentially, our process comprises reacting the insoluble calcium compounds present in the ossified tissue with a solubilizing reagent to form highly ionized soluble calcium salts, and then forcing migration of the resulting calcium cations from the tissue to the negative electrode of an electrolytic cell.

Figure 1:
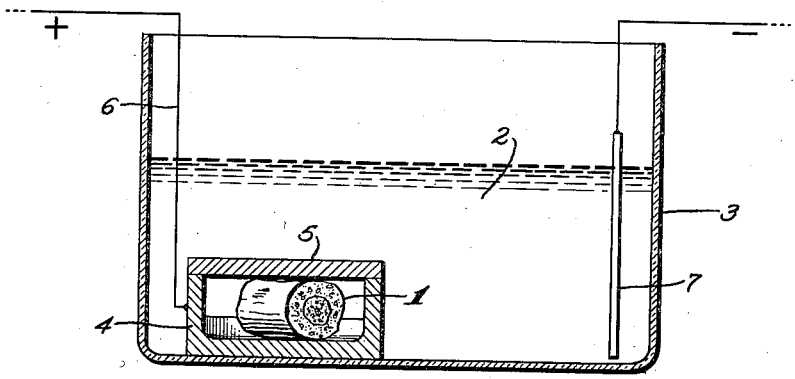
Figure 1 is a diagrammatic section illustrating a device for carrying out our process.

Referring to Figure 1, the bone specimen 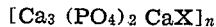 is immersed in solution 2 contained in tank 3. The solution contains a reagent chemical which reacts with the insoluble calcium compounds in the bone to form soluble, ionized salts. Any reagent which will react to form free, mobile calcium ions in solution may be employed. Preferably, the reagent should react rapidly and have no injurious effect on the tissue. We have found that non-oxidizing, highly ionized acids, such as hydrochloric acid, are particularly suitable for our purpose. Hydrochloric acid, for example, reacts rapidly with the insoluble calcium compounds to form very soluble, highly ionized calcium chloride, and when properly employed has no destructive effect on the tissue. Organic acids, such as acetic acid, may also be used, but because of their relatively low degree of ionization, the reaction rate is somewhat slow. Organic and inorganic salts, which react to form soluble calcium salts, such as acetates and chlorides, are also relatively slow in their action. Nitric acid, chromate and dichromate salts react to form highly soluble ionized calcium salts, but their oxidizing action injures the tissues.

The bone specimen is placed in intimate contact with the anode of the electrolytic cell, so that in effect, it becomes part of the anode. This may be accomplished in several ways, as for example, as shown diagrammatically in Figure 1, by placing the bone in a cup or trough-shaped anode 4. A cover plate 5 may be employed to keep the specimen in place, but should not cover the trough entirely so as to permit free access of the treating solution. Lead-in wire 6 is preferably insulated. Preferably, both the anode and cathode 7 are made of conducting materials, such as platinum, carbon or tungsten, which are not attacked by the electrolytic solution in the course of electrolysis.

The electrolytic cell may be attached to any source of direct current, such as a 6-volt storage battery, or an A. C. circuit equipped with a rectifier. The amperage, which may be controlled by means of a rheostat, should preferably be such as to maintain the temperature of the bath solution between 30° and 45° C. Although higher temperatures increase the speed of the reaction, they also tend to cause disintegration of the tissues. The use of a tank which is sufficiently large to prevent overcrowding, also lessens the danger of overheating.

The positively charged calcium ions, which are present in solution as a result of the formation of highly ionized, soluble calcium salts by the action of the solubilizing reagent, such as hydrochloric acid, are forced to migrate from the bone towards the cathode under the influence of the similarly charged anode. This removal of calcium ions from the area of reaction, facilitates the solubilizing reaction so that decalcification proceeds rapidly.

We have found that the rate of decalcification may be greatly accelerated by adding to the solubilizing reagent a reagent which exerts a softening effect on the ossified tissue. The softening of the tissue apparently facilitates the penetration of the solubilizing reagent. Formic acid is particularly effective for this purpose. Complete decalcification of bone is accomplished with solutions comprising 10% formic acid and 8% hydrochloric acid within 2 to 6 hours, whereas, 8% hydrochloric acid alone requires in excess of 12 hours. The amount of time actually required for a given bone specimen will, of course, vary, depending upon the size of the bone, the temperature of the bath and other factors, such as amperage and voltage applied. The bone specimen should be removed from the bath as soon as decalcification is completed, since further immersion may result in some destruction of the tissues.

Not only does the mixture of hydrochloric acid and formic acid accomplish exceedingly rapid decalcification, but it causes substantially no destruction of tissue. Bone sections obtained after electrolytic treatment with such a solution are clear and show uniformly excellent bone and marrow cell detail. The concentrations of the acids comprising the mixture may be varied. However, we have found that some destruction of tissue may occur when the formic acid is employed in concentrations in excess of about 10%. The concentration of hydrochloric acid should also preferably be about 8%. Lower concentrations of these reagents are somewhat slower in their action.

Figure 2:
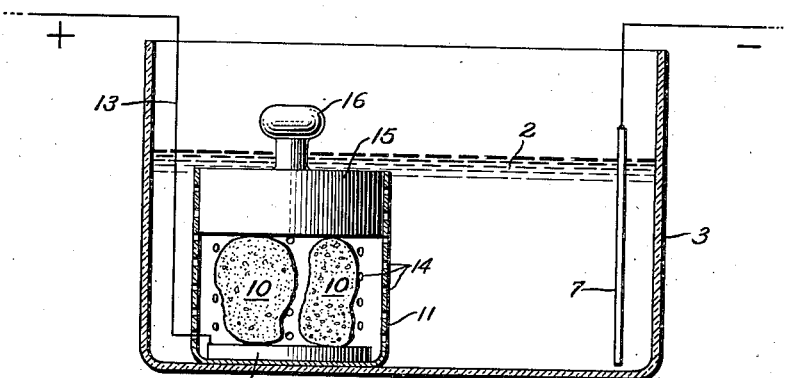
Figure 2 is a diagrammatic section showing a preferred modification of the bone receptacle.

Figure 2 shows a particularly convenient means for incorporating either one or a plurality of bone specimens into the anode. Bone specimen 10 is placed within receptacle 11, and rests on a positively charged electrode plate 12 which is interiorly positioned on the bottom of the receptacle. The receptacle is preferably made of a non-conducting material such as glass or plastic, which is not subject to reaction with the bath solution. Insulated wire 13 connects the electrode plate to the positive terminal of the source of current and may be attached to the anode, as shown, or in any desired manner. The lead-in wire is preferably insulated. The walls of the bone receptacle are perforated with a plurality of orifices 14 to permit fluid exchange about the bone. These orifices may be of any desired shape or size. A presser means such as plate 15, having a diameter which permits insertion into the bone receptacle, rests on the bone, thus ensuring contact of the tissue with the anode plate. The presser means is provided with an upwardly projecting knob 16 to facilitate insertion and removal, and is preferably made of a material such as glass, which is inert with respect to the bath solution. By thus energizing only the floor of the receptacle instead of the entire receptacle, the action of the anode is concentrated directly upon the tissues resting on it. The anode plate may be positioned on the bottom closure of the receptacle, as shown, or may itself constitute the bottom closure.

Figure 3:
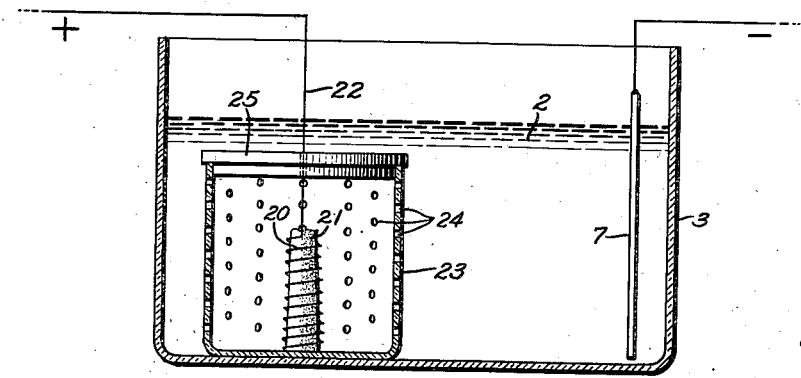
Figure 3 is a diagrammatic section showing still another modification.

The anode may also be directly attached to the bone specimens in any desired manner. Figure 3 shows a modification in which a wire anode 20 is coiled about the bone specimen 21, so as to impinge upon it and hold it. Lead-in wire 22 is preferably insulated. Although this is not essential, a receptacle 23 may be provided as a convenient means for holding the bone specimens and impinging anode. The receptacle is provided with orifices 24 to permit fluid exchange, and a lid 25. This modification is useful where one specimen is to be treated, but is somewhat awkward for use with a plurality of specimens.

We have found also that decalcification of the ossified tissue will occur if the tissue is immersed in the solubilizing solution as aforedescribed in an electrolytic cell without placing it in contact with the anode. However, the rate of decalcification is very much slower than that which occurs when the tissue is incorporated into the anode, so that from a practical standpoint the latter method is considerably more feasible.

Although we have illustrated our invention with reference to preferred embodiments thereof, it will be obvious to those skilled in the art that other variations are contemplated within the scope of the appended claims.

Having thus fully described our invention, we claim:

1. A process for rendering ossified tissue non-opaque which comprises removing the opacifying, insoluble calcium salts by contacting said tissue with the anode of an electrolytic cell in the presence of an aqueous solution containing a reagent which reacts with said insoluble calcium salts to form soluble ionized calcium salts, said tissue being spaced from the cathode, and moving the resulting free calcium ions from the tissue toward the cathode by passing an electric current through said electrolytic cell.

2. A process for rendering ossified tissue non-opaque which comprises removing the opacifying, insoluble calcium salts by contacting said tissue with the anode of an electrolytic cell in the presence of an aqueous solution containing a non-oxidizing acid which reacts with said insoluble calcium salts to form soluble ionized calcium salts, said tissue being spaced from the cathode, and moving said free calcium ions from the ossified tissue toward the cathode by passing an electric current through said electrolytic cell.

3. A process for rendering ossified tissue non-opaque which comprises removing the opacifying, insoluble calcium salts by contacting said tissue with the anode of an electrolytic cell in the presence of a dilute aqueous solution of hydrochloric acid which reacts with said insoluble calcium salts to form soluble ionized calcium chloride, said tissue being spaced from the cathode, and moving the resulting free calcium ions from the tissue toward the cathode by passing an electric current through said electrolytic cell.

4. A process for rendering ossified tissue non-opaque which compirses removing the opacifying, insoluble calcium salts by contacting said tissue with the anode of an electrolytic cell in the presence of an aqueous solution containing in admixture a reagent which exerts a softening effect on said tissue, and a reagent which reacts with said insoluble calcium salts to form soluble ionized calcium salts, said tissue being spaced from the cathode, and moving the resulting free calcium ions from the tissue toward the cathode by passing an electric current through said electrolytic cell.

5. A process for rendering ossified tissue nonopaque which comprises removing the opacifying, insoluble calcium salts by contacting said tissue with the anode of an electrolytic cell in the presence of an aqueous solution containing in admixture a reagent which exerts a softening effect on said tissue, and a non-oxidizing acid which reacts with said insoluble calcium salts to form soluble ionized calcium salts, said tissue being spaced from the cathode, and moving the resulting free calcium ions from the tissue toward the cathode by passing an electric current through said electrolytic cell.

6. A process for rendering ossified tissue nonopaque which comprises removing the opacifying, insoluble calcium salts by contacting said tissue with the anode of an electrolytic cell in the presence of an aqueous solution containing in admixture, formic acid and a non-oxidizing acid which reacts with said insoluble calcium salts to form soluble ionized calcium salts, said tissue being spaced from the cathode, and moving the resulting free calcium ions from the tissue toward the cathode by passing an electric current through said electrolytic cell.

7. A process for rendering ossified tissue nonopaque which comprises removing the opacifying, insoluble calcium salts by contacting said tissue with the anode of an electrolytic cell in the presence of an aqueous solution containing in admixture, formic acid and hydrochloric acid, said tissue being spaced from the cathode, and moving the resulting free calcium ions from the tissue toward the cathode by passing an electric current through said electrolytic cell.

8. A process for rendering ossified tissue nonopaque which comprises removing the opacifying, insoluble calcium salts by contacting said tissue with the anode of an electrolytic cell in the presence of an aqueous solution containing about 10% formic acid and about 8% hydrochloric acid, said tissue being spaced from the cathode, and moving the resulting free calcium ions from the tissue toward the cathode by passing an electric current through said electrolytic cell.

9. A process for rendering ossified tissue nonopaque which comprises removing the opacifying, insoluble calcium salts by immersing said tissue in an aqueous solution in an electrolytic cell, said tissue being adjacent to the anode and spaced from the cathode, said solution containing a reagent which reacts with said insoluble calcium salts to produce free calcium ions in solution, and moving said free calcium ions from the ossified tissue toward the cathode by passing an electric current through said electrolytic cell.

10. A process for rendering ossified tissue nonopaque which comprises removing the opacifying, insoluble calcium salts by immersing said tissue in an aqueous solution in an electrolytic cell, said tissue being adjacent to the anode and spaced from the cathode, said solution containing in admixture a reagent which exerts a softening effect on said tissue, and a reagent which reacts with said insoluble calcium salts to produce free calcium ions in solution, and moving said free calcium ions from the ossified tissue toward the cathode by passing an electric current through said electrolytic cell.

11. A process for rendering ossified tissue nonopaque which comprises removing the opacifying, insoluble calcium salts by immersing said tissue in an aqueous solution in an electrolytic cell, said tissue being adjacent to the anode and spaced from the cathode, said solution containing in admixture, formic acid and hydrochloric acid, and moving the resulting free calcium ions from the tissue toward the cathode by passing an electric current through said electrolytic cell.

MAX GELFAND.
IRVING M. RICHMAN.

REFERENCES CITED

The following references are of record in the file of this patent:

UNITED STATES PATENTS

| Number | Name | Date |
| --- | --- | --- |
| 310,146 | Murphy | Dec. 20, 1884 |
| 407,386 | Wiswell | July 23, 1889 |
| 612,008 | Baldo | Oct. 11, 1898 |
| 645,033 | Chaplin et al. | Mar. 11, 1902 |
| 840,511 | Packard | Jan. 8, 1907 |
| 1,113,323 | Foye et al. | Oct. 13, 1914 |
| 1,517,631 | Jones | Dec. 2, 1924 |

OTHER REFERENCES

"American Journal Of Clinical Pathology (Technical Section)" vol. 12 (1942), pages 79 thru 82.